United States Patent [19]

Seki et al.

[11] Patent Number: 5,132,913
[45] Date of Patent: Jul. 21, 1992

[54] METHOD AND APPARATUS FOR CREATING A THREE-DIMENSIONAL SPACE CURVE BY SMOOTHLY CONNECTING A THREE-DIMENSIONAL SEQUENCE OF DISCRETELY GIVEN PAINTS

[75] Inventors: Masaki Seki, Tokyo; Koji Samukawa; Osamu Hanaoka, both of Yamanashi, all of Japan

[73] Assignee: Fanuc Ltd., Yamanashi, Japan

[21] Appl. No.: 445,622

[22] PCT Filed: Apr. 4, 1989

[86] PCT No.: PCT/JP89/00354
§ 371 Date: Dec. 5, 1989
§ 102(e) Date: Dec. 5, 1989

[87] PCT Pub. No.: WO89/09954
PCT Pub. Date: Oct. 19, 1989

[30] Foreign Application Priority Data

Apr. 8, 1988 [JP] Japan .................... 63-086852

[51] Int. Cl.$^5$ ............................. G05B 19/41
[52] U.S. Cl. .................. 364/474.31; 364/723
[58] Field of Search ............ 364/474.29, 474.31, 364/718, 723

[56] References Cited

U.S. PATENT DOCUMENTS

| | | | |
|---|---|---|---|
| 3,860,805 | 1/1975 | Strukel | 364/718 |
| 3,882,304 | 5/1975 | Walters | 364/723 |
| 3,969,615 | 7/1976 | Bowers et al. | 364/474.29 |
| 4,704,688 | 11/1987 | Kamata | 364/474.31 |
| 4,878,171 | 10/1989 | Kiya et al. | 364/474.31 |

Primary Examiner—Jerry Smith
Assistant Examiner—Patrick D. Muir
Attorney, Agent, or Firm—Staas & Halsey

[57] ABSTRACT

A three-dimensional sequence of discretely given points Pi (i = 1, 2, ...) is projected onto two mutually adjacent planes (XY plane, YZ plane) in a rectangular coordinate system. Next, two-dimensional point sequence connecting curves (TQ, TR) which smoothly connect the projected point sequences (Qi, Ri) on the respective planes are obtained, and a space curve is created using these two-dimensional point sequence connecting curves. Specifically, the common axis (Y axis) of the two mutually adjacent planes is partitioned at minute intervals, coordinates (xj,yj), (yj,zj) of points (Qj,Rj) on each of the two-dimensional point sequence connecting curves (TQ, TR) having a common axis coordinate yj of a j-th partitioning point are successively obtained, and the space curve is created by the coordinates (xj,yj,zj) (j = 1, 2, ..., n) of a sequence of three-dimensional points (Tj).

8 Claims, 8 Drawing Sheets

METHOD AND APPARATUS FOR CREATING A THREE-DIMENSIONAL SPACE CURVE BY SMOOTHLY CONNECTING A THREE-DIMENSIONAL SEQUENCE OF DISCRETELY GIVEN POINTS

BACKGROUND OF THE INVENTION a. Field of the Invention

This invention relates to a method and apparatus for creating a space curve and, more particularly, to a method and apparatus for space curve creation in which a three-dimensional space curve necessary for creating a free curved surface is created by smoothly connecting a three-dimensional sequence of discretely given points.

b. Description of the Related Art

A curved surface of a three-dimensional metal mold or the like on a design drawing is generally expressed by a plurality of section curves, but no profile data is shown for the shape of the area lying between a certain section curve and the next adjacent section curve.

In numerically controlled machining, it is essential that machining be carried out so as to smoothly connect these two section curves despite the fact that the profile between them is not given. In other words, this means that machining must be performed by generating the curved surface between the two section curves from such data as that indicative of the section curves, recording on an NC tape the data concerning the generated curved surface, and carrying out machining in accordance with commands from the NC tape. To this end, methods of generating a three-dimensional curved surface using data specifying several sections and section curves of a three-dimensional curved body have been proposed in U.S. Pat. No. 4,491,906 and U.S. Pat. No. 4,589,062.

Figure 9A:
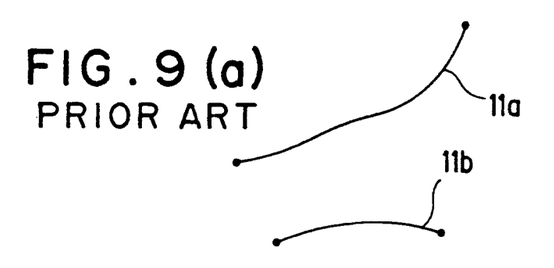
FIG. 9(a)-9(b) are views describing an example of the prior art.
Figure 9B:
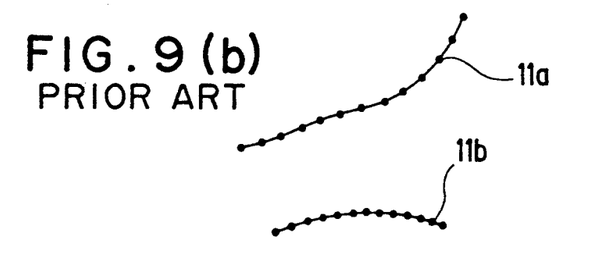
Figure 9C:
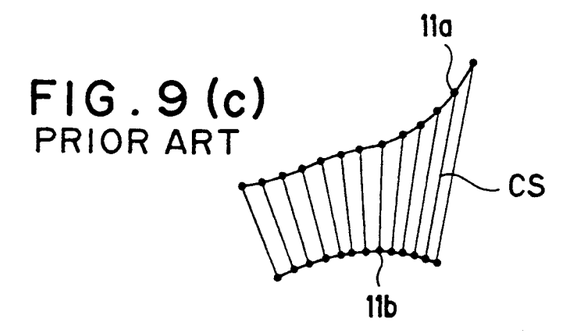

FIGS. 9(a)-9(b) are views for describing a method of generating a three-dimensional curved surface associated with the prior art. The method includes giving three-dimensional curves (reference curves) 11a, 11b [see FIG. 9(a)] of a curved surface cut by a predetermined section, equally partitioning each of the reference curves 11a, 11b into N segments [see FIG. 9(b)], and connecting corresponding partitioning points by straight lines, thereby generating a curved surface CS [see FIG. 9(c)].

Figure 9D:
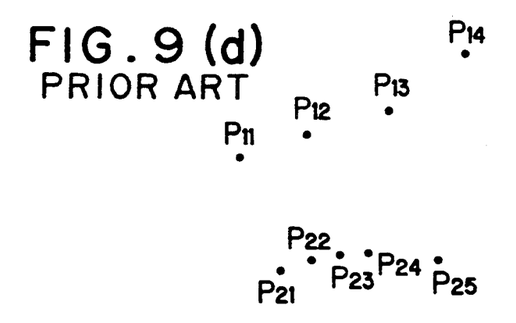

In this method of generating a three-dimensional curved surface, the reference curves, which are three-dimensional curves (space curves) must be specified. To this end, the conventional practice is to give a three-dimensional sequence of discrete points P1i (xi,yi,zi) (i=1, 2, ...) with regard to the reference curve 11a, as shown in FIG. 9(d), give a three-dimensional sequence of discrete points P2j (xj,yj,zj) (j=1, 2, ...) with regard to the reference curve 11b, and interpolate the space between points in each sequence by a cubic polynomial curve so as to smoothly connect each of the three-dimensional point sequences, thereby obtaining the space curves (reference curves).

In this conventional method of creating space curves, adjacent points are connected by a cubic spline curve (for example, see "Shape Processing Engineering [I]" by Fujio Yamaguchi, published by Nikkan Kogyo Shimbunsha, Chapter 3, pp. 80–85). A spline curve $Si(t)$ between two points $Pi-1$, $Pi$ is expressed by the following equation:

$$Si(t) = [t^3\ t^2\ t\ 1] \begin{pmatrix} 2 & -2 & 1 & 1 \\ -3 & 3 & -2 & -1 \\ 0 & 0 & 1 & 0 \\ 1 & 0 & 0 & 0 \end{pmatrix} \begin{pmatrix} \vec{Pi}-1 \\ \vec{Pi} \\ \vec{Ti}-1 \\ \vec{Ti} \end{pmatrix} \quad (1)$$

The space between the points $Pi-1$, $Pi$ is spline-interpolated by varying t over a range of from 0 to 1. Here $\vec{Pi}-1$, $\vec{Pi}$ signify position vectors and, assuming that $Ci$ represents the distance between two points $Pi-1$, $Pi$ and $\vec{Pi}'$ represents a unit tangent vector at the midpoint of a circular arc passing through three consecutive points. $\vec{Ti}$ signifies the product of $Ci$ and $\vec{Pi}'$, namely $Ti=Ci\vec{Pi}'$. $\vec{Ti}-1$ similarly signifies the product of $Ci$ and the unit tangent vector $\vec{Pi}-1'$, namely $Ti-1=Ci\vec{Pi}-1'$. Eq. (1) is an induced equation of a Ferguson curve segment.

A problem encountered with this conventional calculation method of obtaining a three-dimensional spline is that considerable time is required for the calculation processing owing to the use of three-dimensional vectors. The amount of time required is particularly great when using a curved surface generating apparatus on the order of an ordinary personal computer.

Accordingly, an object of the present invention is to provide a method and apparatus for creating a space curve in which the space curve can be generated simply and processing time can be curtailed.

SUMMARY OF THE INVENTION

In order to attain the foregoing object, a three-dimensional sequence of discretely given points Pi (i=1, 2, ...) is projected onto two mutually adjacent planes in a rectangular coordinate system. Next, two-dimensional point sequence connecting curves which smoothly connect the projected point sequences on the respective planes are obtained, and a space curve is created using these two-dimensional point sequence connecting curves. More specifically, the common axis of the two mutually adjacent planes is partitioned at minute intervals, coordinates (xj,yj), (yj,zj) of points on each of the two-dimensional point sequence connecting curves having a common axis coordinate yj of a j-th partitioning point are successively obtained, and the space curve is created by the three-dimensional coordinates,,(xj,yj,.zj) (j=1, 2, ..., n).

DESCRIPTION OF THE PREFERRED EMBODIMENTS

Figure 1A:
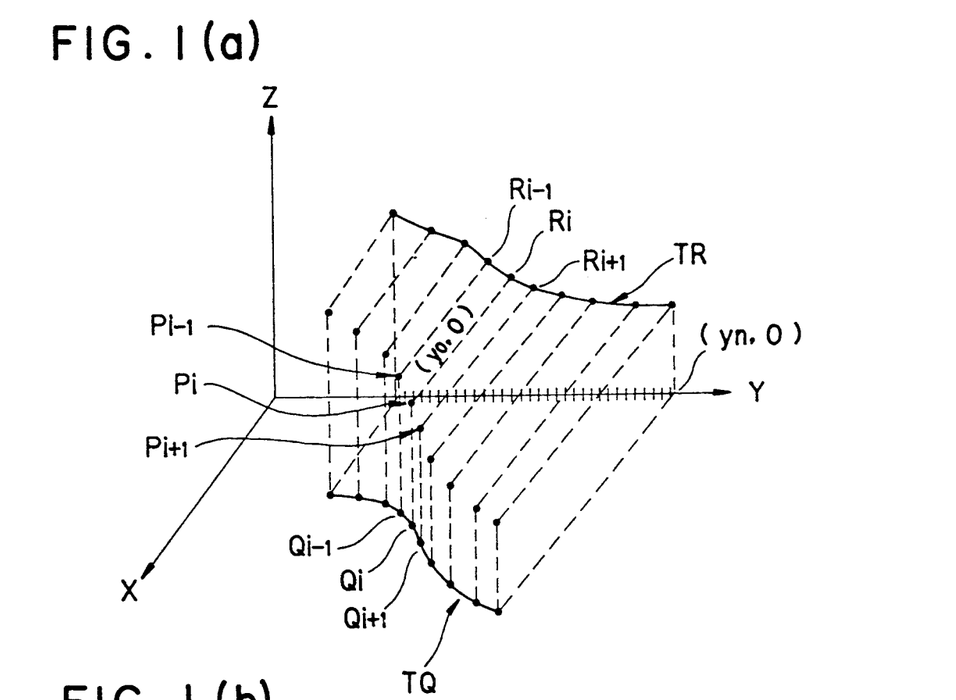
FIGS. 1(a) and 1(b) are views for describing the general features of the present invention.
Figure 1B:
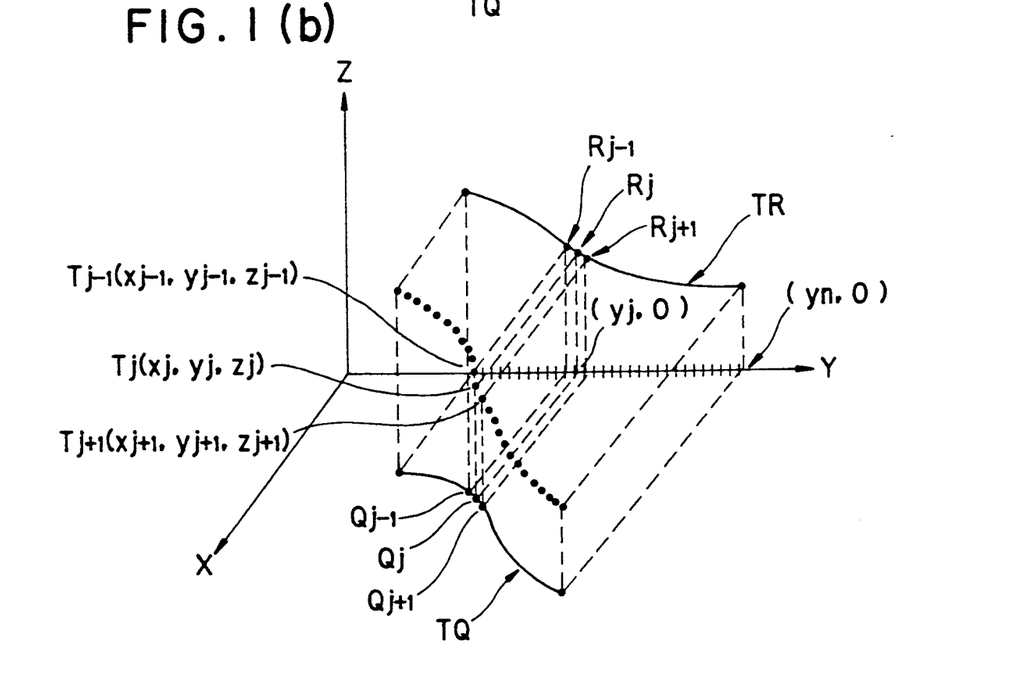

FIGS. 1(a) and 1(b) are views for describing the general features of the present invention.

Pi (i=1, 2 ...) denotes a three-dimensional sequence of discretely given points, Qi (i=1, 2 ...) denotes a first two-dimensional point sequence on an X-Y plane, and Ri (i=1, 2 ...) a second two-dimensional point sequence on a Y-Z plane. TQ denotes a first two-dimensional point sequence connecting curve which smoothly connects all pairs of points on the first two-dimensional point sequence Qi as by spline interpolation, TR denotes a second two-dimensional point sequence connecting curve similarly obtained from the second two-dimensional point sequence Ri, yj denotes a coordinate on the Y axis, xj denotes an X-axis coordinate of a point Qj on the first two-dimensional point sequence connecting curve TQ corresponding to the coordinate yj, zj denotes a Z-axis coordinate of a point Rj on the second two-dimensional point sequence connecting curve TR corresponding to the coordinate yj, and Tj (xj,yj,zj) a three-dimensional coordinate point sequence.

The three-dimensional sequence of discretely given points Pi (i=1, 2, ...) is projected onto two mutually adjacent planes (e.g., the X-Y plane and Y-Z plane) in a rectangular coordinate system, and the projected two-dimensional point sequence Qi (i=1, 2, ...) on the first plane and the projected two-dimensional point sequence Ri (i=1, 2, ...) on the second plane are obtained. Next, the first two-dimensional point sequence connecting curve TQ is obtained by smoothly connecting all pairs of points on the first two-dimensional point sequence Qi, and the second two-dimensional point sequence connecting curve TR is obtained by smoothly connecting all pairs of points on the second two-dimensional point sequence Ri. Thereafter, the common coordinate axis (Y axis) of the two mutually adjacent planes is partitioned into n segments at minute intervals, coordinates (xj,yj), (yj,zj) of the points Qj, Rj on the first and second two-dimensional point sequence connecting curves TQ, TR corresponding to the Y-axis coordinate yj of a j-th (j=1, 2, ...) partitioning point are successively obtained, and the space curve is created by the three-dimensional coordinates (xj,yj,zj) (j=1, 2, ..., n).

Figure 2:
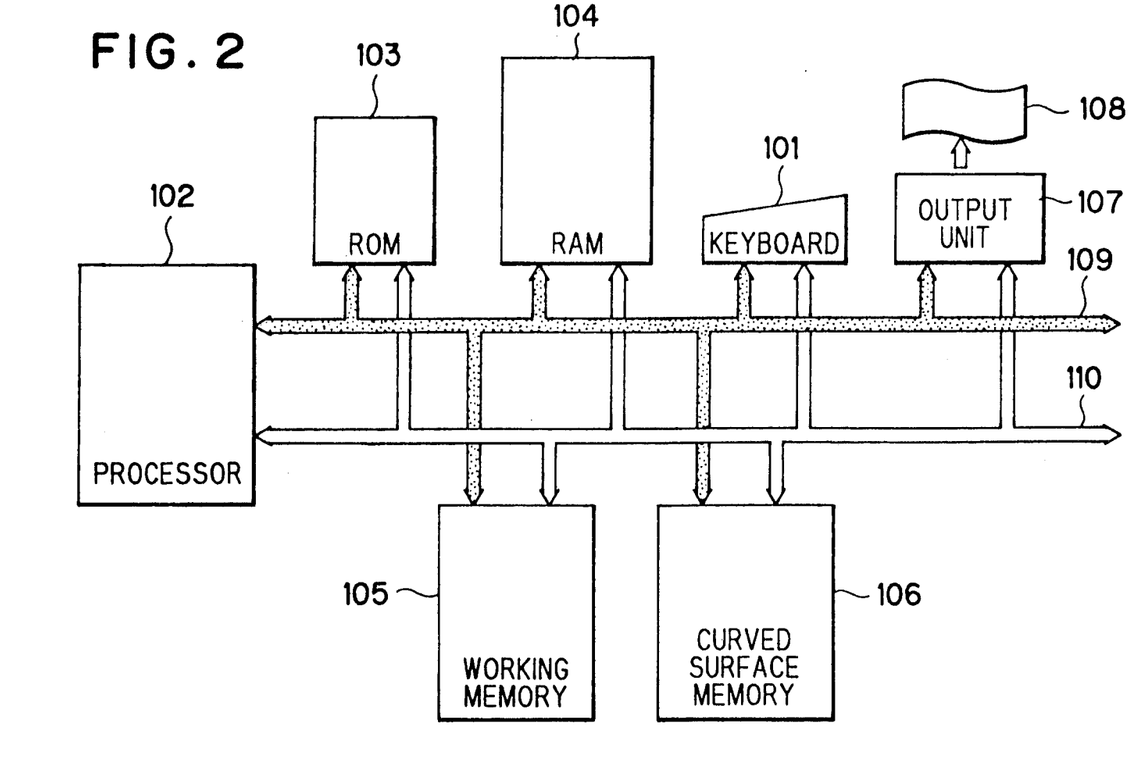
FIG. 2 is a block diagram of an apparatus for realizing the present invention.

FIG. 2 is a block diagram of an automatic programming apparatus for realizing the present invention. Reference numeral 101 denotes a keyboard for inputting three-dimensional point-sequence data, the number of partitions n, the common axis and other data, 102 denotes a processor, 103 denotes a ROM storing a control program, 104 denotes a RAM, 105 denotes a working memory, 106 denotes a curved surface memory for storing generated three-dimensional curve data, curved surface data and NC program data for curved surface machining, 107 denotes an output unit for outputting generated curved surface data or NC program data for curved surface machining to an external storage medium 108 such as a paper tape or magnetic tape, 109 denotes an address bus, and 110 denotes a data bus.

Figure 3:
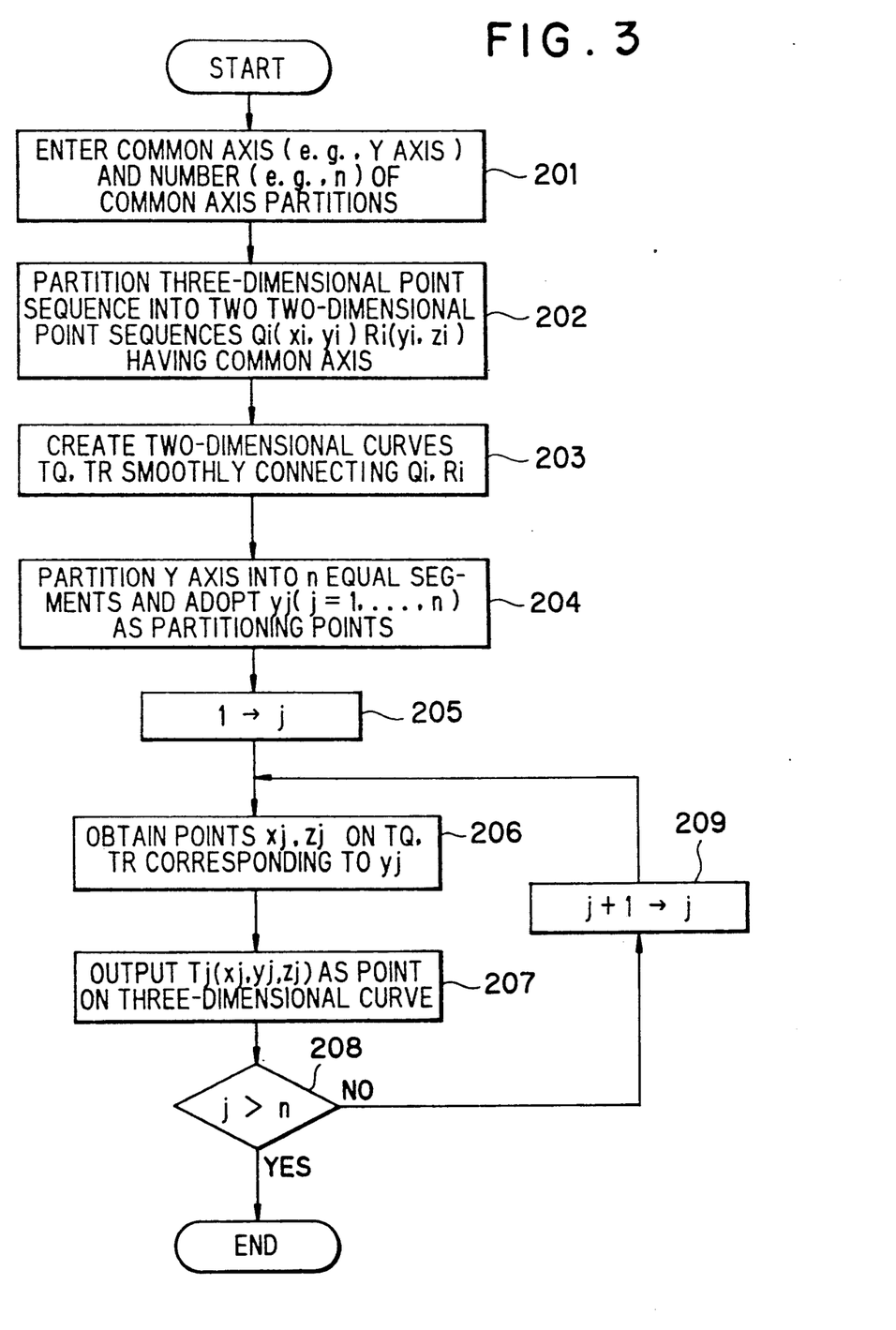
FIG. 3 is a flowchart of processing according to the invention.

FIG. 3 is a flowchart of the method of creating a space curve in accordance with the present invention, and FIGS. 4 through 7 are views for describing the present invention. The present invention will now be described in accordance with the flowchart of FIG. 3 showing the processing for creating space curves. It will be assumed here that data for creating a space curve, e.g., a three-dimensional sequence of discretely given points [a position vector Pi (i=0, 1, 2, ... m)], has already been entered.

The operator designates a common axis (e.g., the Y axis) from among the three-dimensional axes, enters the number of partitions n for partitioning the Y axis and starts space curve creation processing by a predetermined method (step 201).

Figure 4:
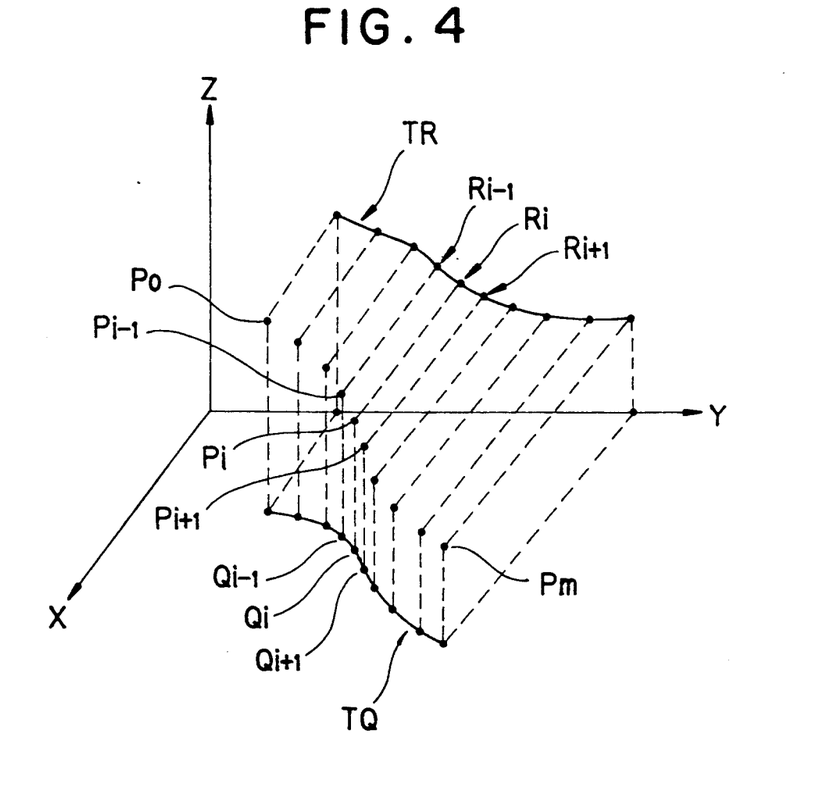
FIG. 4 is a view for describing two-dimensional point sequences obtained when a three-dimensional point sequence is projected onto two mutually adjacent planes.

When this done, the processor 102 obtains the two-dimensional point sequences Qi (xi,yi) and Ri(yi,zi) by projecting the three-dimensional point sequence Pi (xi,yi,zi) (i=0, 1, 2, ... m) onto two coordinate planes (the X-Y coordinate plane and Y-Z coordinate plane) sharing the Y axis as the common axis, and stores the coordinates of these two-dimensional point sequences Qi, Ri in the RAM 104 (see FIG. 4; step 202).

Next, the processor 102 uses the coordinates of the two-dimensional point sequences Qi, Ri stored in the RAM 104 to obtain the two-dimensional point sequence connecting curves (plane curves) TQ, TR which smoothly connect all pairs of points on the two-dimensional point sequences Qi, Ri. It should be noted that the two-dimensional point sequence connecting curves TQ, TR are generated using a well-known technique, e.g., the induced equation of a Ferguson curve segment (already described in the prior art). The steps are as follows:

(a) The processor 102 obtains a circular arc CAR (see FIG. 5) which passes through three consecutive points Qi−1, Qi, Qi+1 from among Qi (xi,yi) (i=0, 1, 2, ... m).

Figure 5:
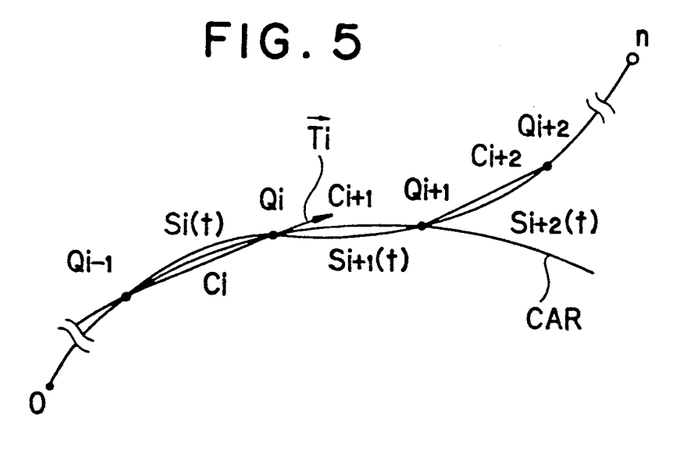
FIG. 5 is a diagram illustrating a two-dimensional point sequence connecting curve obtained by connecting a two dimensional point sequence by a spline curve.

(b) When the circular arc CAR has been found, the processor obtains a unit tangent vector $\vec{Q_i'}$ of a tangent line to the arc CAR at the midpoint $\vec{Q_i}$.

(c) The processor 102 then computes a straight-line distance Ci between point Qi−1 and point Qi.

(d) When the distance Ci has been found, the processor obtains tangent vectors $\vec{T_{i-1}}$, $\vec{T_i}$, varies t over a range of from 0 to 1 and computes the coordinates Si(t) of a point on the curve smoothly connecting the points Qi−1 and Qi in accordance with the equation $$Si(t) = [t^3 \; t^2 \; t \; 1] \begin{pmatrix} 2 & -2 & 1 & 1 \\ -3 & 3 & -2 & -1 \\ 0 & 0 & 1 & 0 \\ 1 & 0 & 0 & 0 \end{pmatrix} \begin{pmatrix} Qi-1 \\ Qi \\ Ti-1 \\ Ti \end{pmatrix} \quad (2)$$

(e) The processing of steps (a)–(d) is performed at all i=0, 1, 2, ... m to obtain the two-dimensional point sequence connecting curve TQ.

The processor similarly obtains the two-dimensional point sequence connecting curve TR from Ri (yi,zi) (i=0, 1, 2, ... m) (step 203).

Figure 6:
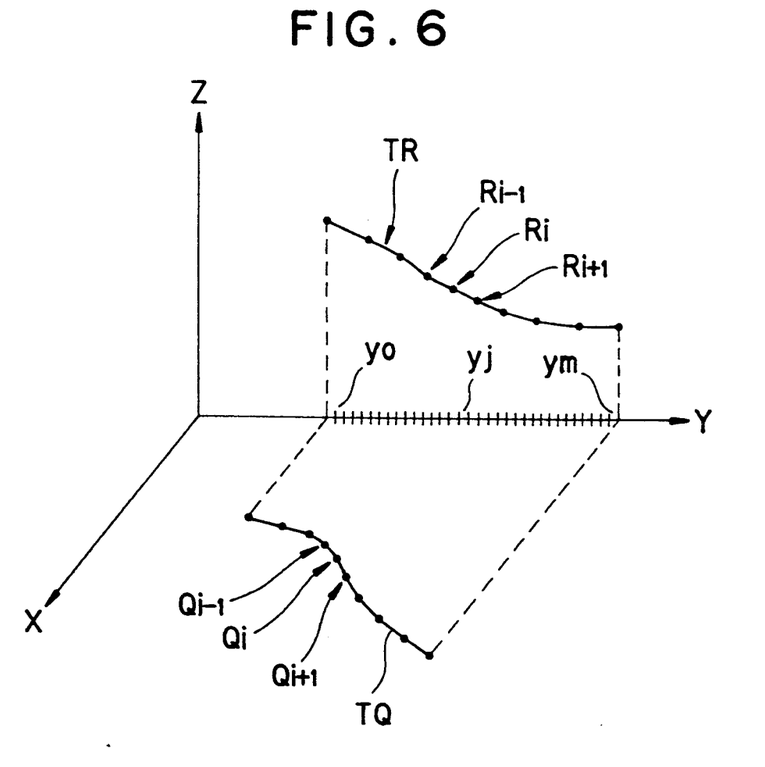
FIG. 6 is a view for describing partitioning of a common axis into n segments.

When the two-dimensional point sequence connecting curves TQ, TR have been obtained, the processor uses the number of partitions n entered at step 201 to partition, into n equal segments, the Y axis between the Y-axis coordinate $y_o$ of the starting point Po of the three-dimensional point sequence and the Y-axis coordinate $y_m$ of the end point of the three-dimensional point sequence, and stores the j-th Y-axis coordinate yj (j=0, 1, 2, ... n) in the RAM 104 (see FIG. 6; step 204). It should be noted that the larger the number of partitions n is made to shorten the partitioning interval, the more accurate the space curve that can be generated. Accordingly, the number of partitions n is decided in such a manner that the partitioning interval of the common coordinate axis will be considerably smaller than the interval of the three-dimensional sequence of discretely given points Pi.

Figure 7:
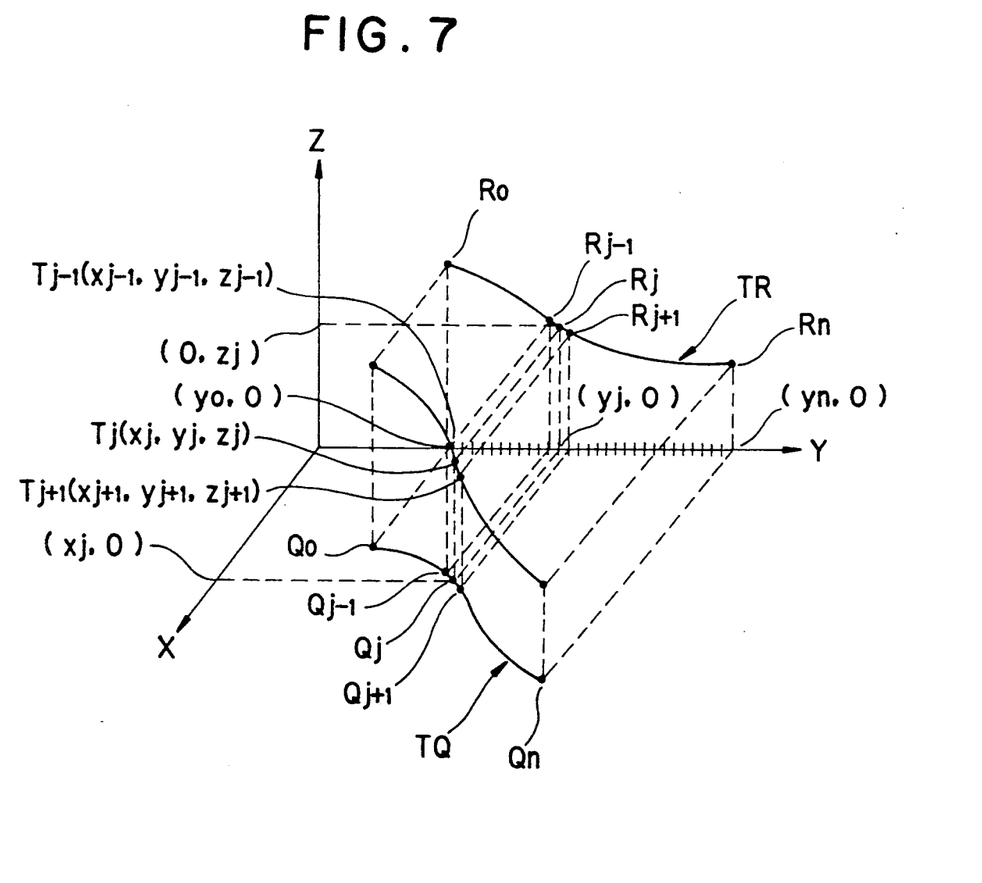
FIG. 7 is a view for describing processing for creating space curves.

The processor performs the operation 1→j (step 205), obtains the coordinates (xj,yj), (yj,zj) of the points Qj, Rj on the two-dimensional point sequence connecting curves TQ, TR having the Y-axis coordinate yj of the j-th partitioning point (step 206), and stores the point Tj (xj,yj,zj) in the curved surface memory 106 as the j-th point on the space curve (see FIG. 7; step 207).

The processor 102 then determines whether j>n holds (step 208). If j>n does not hold, then the processor performs the operation $$j+1 \rightarrow j$$

(step 209) and, repeats processing from step 206 onward. If j>n holds (step 208), then the processor ends the processing for creating space curves.

When creation of space curves ends, it is possible to create three-dimensional curved surface machining data using the space curve information.

In this example, the two-dimensional point sequence connecting curves are obtained using the induced equation of a Ferguson curve segment. However, any method is permissible so long as it obtains plane curves smoothly connecting two points using two-dimensional sequences of discretely given points.

Figure 8:
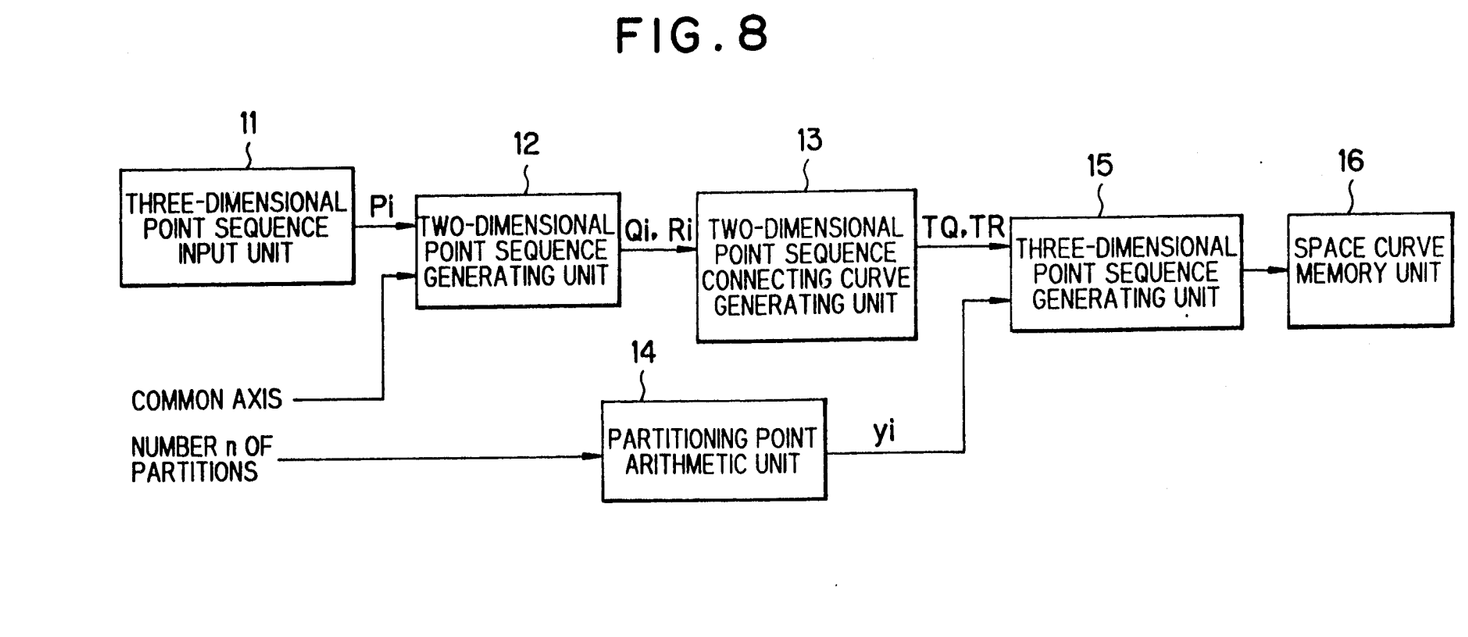
FIG. 8 is a block diagram showing a space curve creating apparatus for practicing the present invention.

FIG. 8 is a block diagram of another apparatus for creating space curves for practicing the method of the invention. Reference numeral 11 denotes a three-dimensional point sequence input unit for inputting a three-dimensional point sequence; 12 denotes a two-dimensional point sequence generating unit for generating the first two-dimensional point sequence Qi and the second two-dimensional point sequence Ri by projecting the input three-dimensional point sequence onto two mutually adjacent planes (e.g., XY and YZ planes) of a rectangular coordinate system; 13 denotes a two-dimensional point sequence connecting curve generating unit for generating the first two-dimensional point sequence connecting curve TQ which smoothly connects, by a spline curve, all pairs of points on the first two-dimensional point sequence Qi, and the second two-dimensional point sequence connecting curve TR which smoothly connects, by a spline curve, all pairs of points on the second two-dimensional point sequence Ri. Reference number 14 denotes a partitioning point arithmetic unit for partitioning the common coordinate axis (Y axis) of the two mutually adjacent planes into n segments and computing the coordinates of each partitioning point; 15 denotes a three-dimensional point sequence generating unit (space curve generating unit) for successively obtaining the coordinates (xj,yj), (yj,zj) on the first and second two-dimensional point sequence connecting curves TQ, TR corresponding to the coordinate yj of the j-th partitioning point (j=1, 2, ..., n), and for computing the coordinates (xj,yj,zj) (j=1, 2, ..., n) of the three-dimensional sequence of points Tj; and 16 denotes a space curve memory for successively storing the coordinates of the three-dimensional sequence of points Tj.

In accordance with the invention as set forth above, the arrangement is such that a three-dimensional space curve is created using solely processing for creating two-dimensional point sequence connecting curves. As a result, a space curve can be generated in a simple manner and processing time can be reduced.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

What is claimed is:

1. A space curve creation method for creating a three-dimensional space curve by smoothly connecting three-dimensional sequence of discretely given points, said method comprising the steps of:
    (a) obtaining a first two-dimensional point sequence and a second two-dimensional point sequence by projecting the three-dimensional point sequence onto two intersecting planes, each of said intersecting planes being defined by two coordinate axes of a rectangular coordinate system;
    (b) obtaining a first two-dimensional point sequence connecting curve which smoothly connects all pairs of points on the first two-dimensional point sequence, and a second two-dimensional point sequence connecting curve which smoothly connects all pairs of points on the second two-dimensional point sequence;
    (c) partitioning a common coordinate axis of the two intersecting planes into n segments;
    (d) successively obtaining coordinates (aj,bj), (bj,cj) on the first and second two-dimensional point sequence connecting curves corresponding to a coordinate bj of a j-th partitioning point (j=1, 2, ..., n) from among partitioning points for partitioning by n;
    (e) creating the three-dimensional space curve by three-dimensional coordinates (aj,bj,cj) (j=1, 2, ..., n); and
    (f) using the three-dimensional space curve created in step (e) to machine a workpiece.

2. A space curve creation method according to claim 1, wherein the number of partitions n is decided in such a manner that a partitioning interval of the common coordinate axis will be smaller than an interval of the three-dimensional sequence of discretely given points.

3. A space curve creation method according to claim 1, wherein said obtaining in step (b) comprises the step of smoothly connecting, by spine curves, all pairs of points on the two-dimensional point sequences.

4. A space curve creation apparatus for creating a three-dimensional space curve by smoothly connecting a three-dimensional sequence of discretely given points, said apparatus comprises:
    three-dimensional point sequence input means for inputting the three-dimensional points sequence;
    two-dimensional point sequence generating means for generating a first two-dimensional point sequence and a second two-dimensional point sequence by projecting the three-dimensional points sequence onto two intersecting planes, each of said intersecting planes being defined by two coordinate axes of a rectangular coordinate system;

two-dimensional point sequence connecting curve generating means for generating a first two-dimensional point sequence connecting curve which smoothly connects all pairs of points on the first two-dimensional point sequence, and a second two-dimensional point sequence connoting curve which smoothly connects all pairs of points on the second two-dimensional point sequence;

partitioning point arithmetic means for partitioning the common coordinate axis of the two intersecting planes into n segments and computing the coordinates of each partitioning point; and space curve generating means for successively obtaining coordinates (aj,bj), (bj,cj) on the first and second two-dimensional point sequence connecting curves corresponding to a coordinate bj of a j-th partitioning point (j=1, 2, ..., n) from among the partitioning points for partitioning by n, and for generating the three-dimensional space curve by three-dimensional coordinates (aj,bj,cj) (j=1, 2, ..., n).

5. A method for creating a three-dimensional space curve by smoothly connecting a three-dimensional sequence of discretely given points, said method comprising the steps of:

(a) receiving the three-dimensional sequence of discretely given points;

(b) projecting the three-dimensional sequence of discretely given points onto first and second planes to respectively form first and second two-dimensional point sequences;

(c) connecting points on the first and second two-dimensional point sequences to respectively form first and second two-dimensional point sequence connecting curves;

(d) partitioning the first and second two-dimensional point sequence connecting curves to respectively obtain first and second two-dimensional partition points;

(e) creating the three-dimensional space curve based on the first and second two-dimensional partition points; and (f) using the three-dimensional space curved created in step (e) to machine a workpiece.

6. A method according to claim 5,
wherein the first and second planes are each defined by a rectangular coordinate system with a common coordinate axis, and wherein said partitioning in step (d) comprises the steps of:

(d1) partitioning the common coordinate axis at a predetermined partition interval to form common coordinate partition points; and (d2) projecting the common coordinate partition points onto the first and second two-dimensional point sequence connecting curves to respectively form the first and second two-dimensional partition points.

7. A method according to claim 6, wherein said creating in step (e) comprises the step of forming three-dimensional coordinate points of the three-dimensional space curve using corresponding points of the first and second two-dimensional partition points.

8. A method according to claim 7, wherein the predetermined partition interval is smaller than an interval separating the three-dimensional sequence of discretely given points.

* * * * *

UNITED STATES PATENT AND TRADEMARK OFFICE
CERTIFICATE OF CORRECTION

PATENT NO. : 5,132,913
DATED : July 21, 1992
INVENTOR(S) : Masaki SEKI et al.

It is certified that error appears in the above-identified patent and that said Letters Patent is hereby corrected as shown below:

Title Page, Section [54], line 5, change "PAINTS" to --POINTS--.

Column 1, line 5, change "PAINTS" to --POINTS--; and
         line 38, change "9(a)-9(b)" to --9(a)-9(d)--.

Column 3, line 4, change "9(a)-9(b)" to --9(a)-9(d)--, and
             change "view" to --views for--; and
         line 14, before "a second" insert --denotes--.

Column 4, line 48 (Eq. 2), change "Qi-1" to --$\vec{Q}_{i-1}$--;
         line 50, change "Qi" to --$\vec{Q}_i$--;
         line 51, change "Ti-1" to --$\vec{T}_{i-1}$--; and
         line 52, change "Ti" to --$\vec{T}_i$--.

UNITED STATES PATENT AND TRADEMARK OFFICE
CERTIFICATE OF CORRECTION

PATENT NO. : 5,132,913

DATED : July 21, 1992

INVENTOR(S) : Masaki Seki, et al.

Page 2 of 2

It is certified that error appears in the above-indentified patent and that said Letters Patent is hereby corrected as shown below:

Column 7, line 8, change "connoting" to --connecting--.

Signed and Sealed this

Eleventh Day of January, 1994

Attest:

BRUCE LEHMAN

*Attesting Officer*  *Commissioner of Patents and Trademarks*